United States Patent
Nutz et al.

(10) Patent No.: US 10,202,176 B1
(45) Date of Patent: Feb. 12, 2019

(54) KAYAK WITH ACCESSORY RECEIVER

(71) Applicant: Confluence Outdoor, LLC, Greenville, SC (US)

(72) Inventors: Hans Nutz, Greenville, SC (US); Matthew Montaruli, Greenville, SC (US)

(73) Assignee: Confluence Outdoor, LLC, Greenville, SC (US)

( * ) Notice: Subject to any disclaimer, the term of this patent is extended or adjusted under 35 U.S.C. 154(b) by 0 days.

(21) Appl. No.: 15/664,632

(22) Filed: Jul. 31, 2017

(51) Int. Cl.
*B63B 35/71* (2006.01)
*B63B 17/00* (2006.01)
*A01K 97/10* (2006.01)

(52) U.S. Cl.
CPC .............. *B63B 35/71* (2013.01); *A01K 97/10* (2013.01); *B63B 2035/715* (2013.01)

(58) Field of Classification Search
CPC ......... B63B 17/00; B63B 35/00; B63B 17/04; B63B 35/85; B63B 35/44; B63B 35/815; B60R 9/02; B60R 11/04
USPC ................................................. 114/347, 364
See application file for complete search history.

(56) References Cited

U.S. PATENT DOCUMENTS

| | | | |
|---|---|---|---|
| 3,568,963 A * | 3/1971 | Koskinen | A45B 17/00 248/516 |
| 4,489,028 A | 12/1984 | Masters | |
| 5,040,817 A | 8/1991 | Dunn | |
| 5,666,902 A | 9/1997 | White et al. | |
| 6,213,441 B1 | 4/2001 | Baynard et al. | |
| 6,227,132 B1 | 5/2001 | Garcia | |
| 6,240,865 B1 | 6/2001 | Hubbard | |
| 6,802,275 B2 * | 10/2004 | Schmidt | F16C 11/0604 114/361 |
| 6,860,223 B2 | 3/2005 | Lee et al. | |
| 7,147,399 B2 | 12/2006 | Viscount et al. | |
| 7,152,546 B2 | 12/2006 | Bernath | |
| 7,219,614 B2 | 5/2007 | Stubblefield | |
| 7,302,907 B2 * | 12/2007 | Carlton | B63B 35/815 114/364 |
| 8,757,665 B2 | 6/2014 | Drapes et al. | |
| 9,216,802 B2 | 12/2015 | Larouche et al. | |
| 9,623,937 B2 | 4/2017 | Moffat et al. | |
| 2008/0087211 A1 * | 4/2008 | Sutherland | B63B 17/00 114/364 |
| 2009/0115181 A1 | 5/2009 | Atherton | |
| 2010/0242828 A1 * | 9/2010 | Gratsch | B63B 17/00 114/364 |
| 2011/0097177 A1 | 4/2011 | Carnevali | |
| 2013/0032079 A1 | 2/2013 | Erdahl et al. | |
| 2015/0030386 A1 | 1/2015 | Carnevali | |

(Continued)

OTHER PUBLICATIONS

Perception HiLife Kayak, known at least as early as Jun. 8, 2017, 3 pgs.

(Continued)

*Primary Examiner* — Lars A Olson
(74) *Attorney, Agent, or Firm* — Douglas Kim Law Firm, LLC; Douglas W. Kim

(57) ABSTRACT

A watercraft is described that includes a shell defining a hull and a deck. The deck defines at least one cavity recessed into an upward facing surface of the deck. The at least one cavity is defined by a peripheral wall and a bottom wall. The at least one cavity is configured to receive and removably retain an accessory mount within the cavity.

15 Claims, 5 Drawing Sheets

(56) References Cited

U.S. PATENT DOCUMENTS

2015/0275942 A1 10/2015 Carnevali
2016/0146235 A1 5/2016 Carnevali

OTHER PUBLICATIONS

Harmony Solo Mount Screwball for Sound Kayaks, www.harmonygear.com, known at least as early as Jul. 30, 2017, 2 pgs.
Sound 9.5 Perception, RAM Solo Mount Screwball, known at least as early as Jul. 30, 2017, 2 pgs.

* cited by examiner

KAYAK WITH ACCESSORY RECEIVER

FIELD OF THE DISCLOSURE

The present disclosure relates to personal watercraft, particularly kayaks, made from a molded shell. The present disclosure relates to a system and method of attaching accessories to the kayak.

BACKGROUND

Outdoor enthusiasts are no longer satisfied to hit the water with only their boat, a personal floatation device, and a paddle. Adventure seekers are not content to simply ride the best rapids; they want to film themselves doing so. Anglers are leaving their bass boats behind in exchange for kayaks that are better suited to enter secluded fishing holes. The fisherman, however, are not leaving their gear behind on their large boats. The kayak of choice should allow the angler to bring their rods, cameras, fish finders, GPS, smart phones, net, knives, pliers, bait, lures, or other gear along on the journey.

Many kayaks are not originally manufactured with the addition of aftermarket accessories in mind. As a result, significant effort is required to modify the shell of the kayak in order to accept the owner's desired accessories. FIG. 1 shows an accessory mounting bracket 10 available from SCOTTY Plastics Ltd, Sidney, British Columbia, Canada, which is mounted to the shell of a watercraft by a plurality of screws that must pass through the shell of the boat. The process for the owner to create properly spaced holes in the shell of their boat to accommodate this conventional accessory mounting bracket 10 is time consuming and could lead to damaging the boat.

Other kayaks are available with components that are pre-installed by the manufacturer and are intended to facilitate the attachment of accessories. For example, as shown in FIG. 2, a kayak 20 is delivered with one or more rails 22 pre-attached to the deck of the kayak. These rails 22 are used to mount accessories, like a rod holder, to the kayak 20. The use of pre-installed rails 22 may be an improvement from the user's standpoint with respect to ease of attachment. However, the addition of the rail 22 to the kayak 20 by the manufacturer still requires creating holes in the shell after the initial molding process used to create the kayak's shell.

The present disclosure seeks to provide a system and method of mounting accessories to a kayak, along with a kayak configured for the same, which improves upon the means currently known in the industry for accessory mounting.

SUMMARY

One embodiment of the present disclosure includes a watercraft, comprising a shell defining a hull and a deck. The deck defines at least one cavity recessed into an upward facing surface of the deck. The at least one cavity is defined by a peripheral wall and a bottom wall. The at least one cavity is configured to receive and removably retain an accessory mount within the cavity.

Another embodiment of the present disclosure includes a system, comprising a watercraft and at least one accessory mount. The watercraft comprises a shell defining a hull and a deck. The deck defines at least one cavity recessed into an upward facing surface of the deck, and the cavity is defined by a peripheral wall and a bottom wall. Further, the at least one accessory mount is configured to be received in and removably retained by the at least one cavity upon relative rotation between the at least one accessory mount and the at least one cavity.

Another embodiment of the present disclosure includes a method of attaching accessories to a kayak. The method comprises obtaining a kayak comprising a shell defining a hull and a deck. Further, the deck defines at least one cavity recessed into an upward facing surface of the deck, the cavity defined by a peripheral wall and a bottom wall. The method also includes obtaining at least one accessory mount. The method further comprises rotating the accessory mount relative to the cavity such that the accessory mount is received within and removably retained by the cavity.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

The present disclosure seeks to provide a mounting system that allows owners to quickly, easily, and removably attach accessories to their recreational watercraft, such as kayaks. Attachment of accessories consistent with the disclosed system can be accomplished without the traditional labor required to determine the mounting location, drill holes through the kayak's shell at measured locations, and secure a platform with fasteners extending through the shell.

Figure 1:
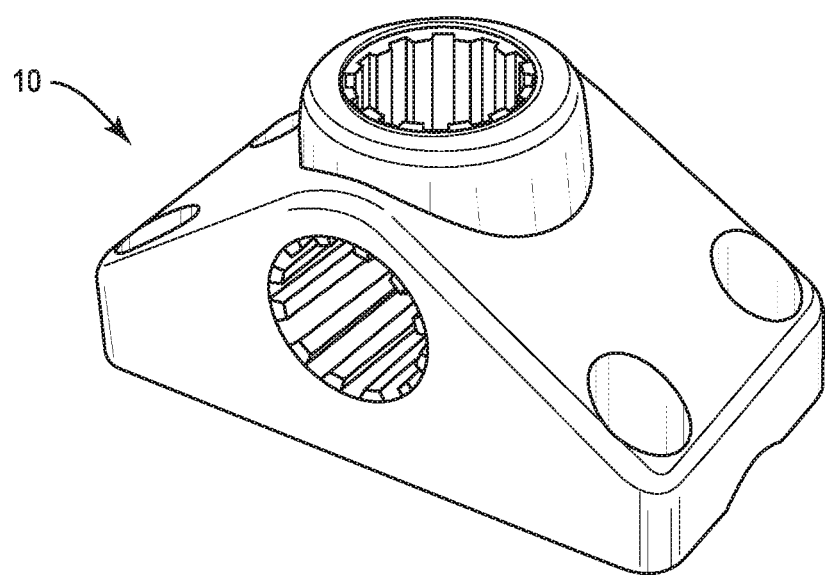
FIG. 1 shows a conventional aftermarket accessory mounting bracket for attaching an accessory to a kayak.
Figure 2:
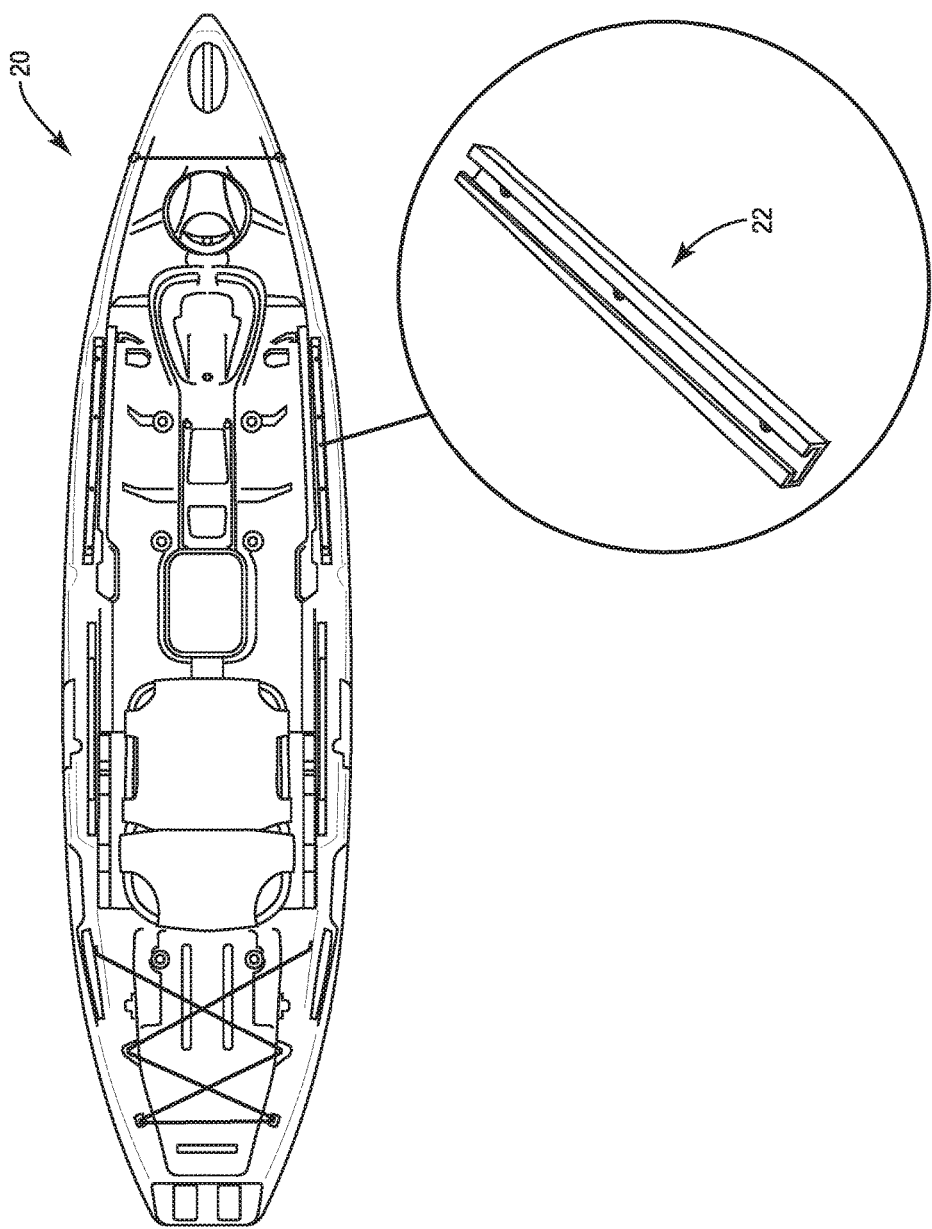
FIG. 2 shows a conventional system for mounting accessories to a kayak.
Figure 3:
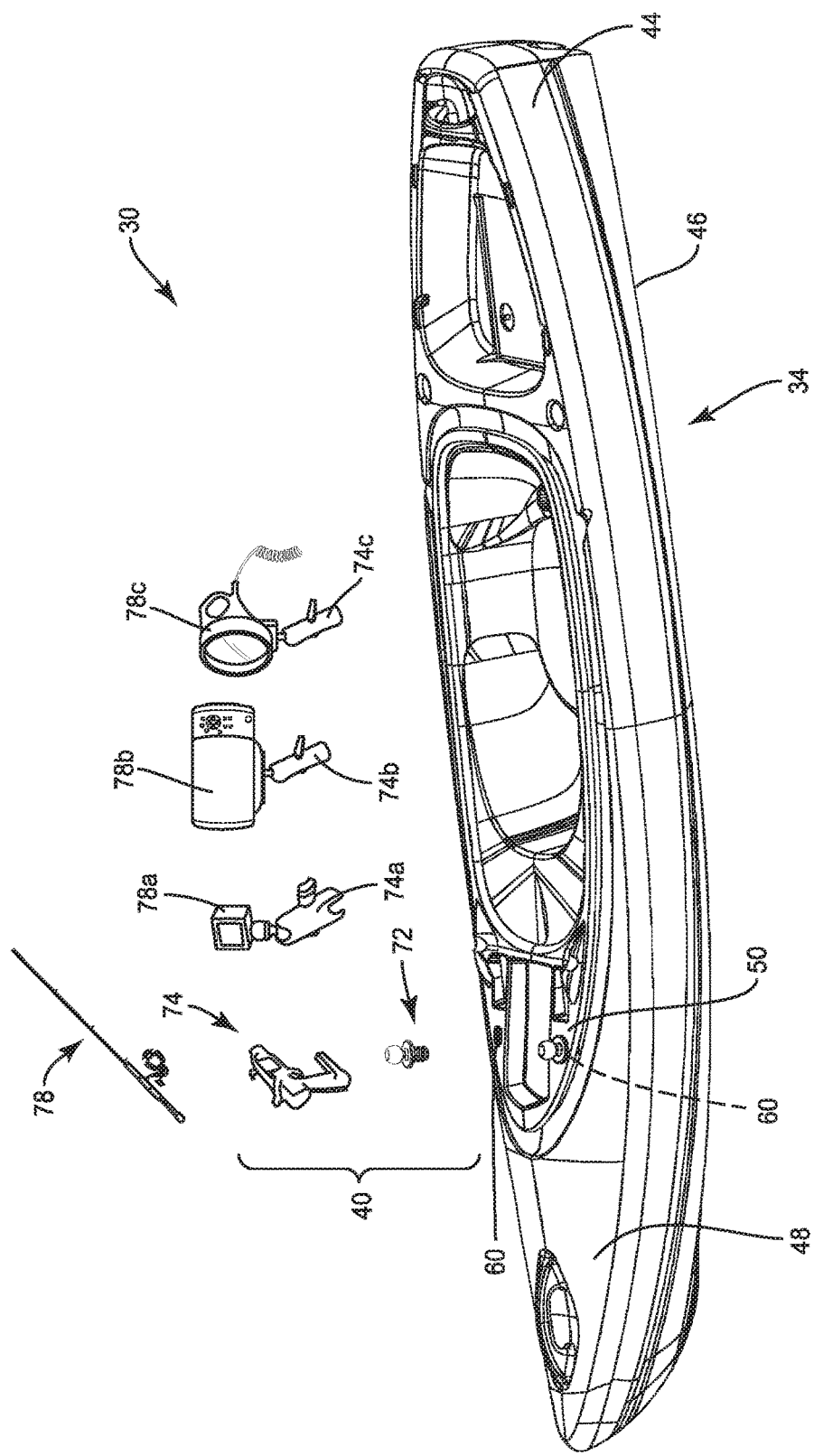
FIG. 3 shows a watercraft incorporating a system for mounting accessories according to an embodiment of the present disclosure.

The mounting system 30, shown in FIG. 3, includes a watercraft 34 and at least one accessory mount 40. The watercraft 34 is a kayak in the illustrated embodiment. As used herein, "watercraft" means personal watercraft, though two or three persons may sometimes be accommodated. The term "watercraft" includes kayaks, canoes, surfboards, stand up paddle boards, or other boats of similar portability. The watercraft 34 includes a shell 44, which may be substantially hollow in the case of a kayak, or solid in the case of a paddle board. The shell 44 may be formed from a molding process, such as a roto-molding process, as is known to those of ordinary skill in the art of personal watercraft manufacturing. The shell 44 has a lower portion to create a hull 46 and an upper portion to create a deck 48. The deck 48 may have one or more generally upward facing surfaces 50.

Notably, to facilitate attachment of the at least one accessory mount 40 to the watercraft 34, at least one cavity 60 is formed in the shell 44, particularly the deck 48. The cavity 60 functions as an integral accessory receiver. The cavity 60 may also be referred to as a socket. Preferably, each cavity 60 is formed integrally with the shell 44 during the molding of the watercraft 34 without adding reinforcing materials or components of a separate material, such as metal. In one example, the shell 44 is formed in a rotational mold. The rotational mold is provided with a metal plug, around which the cavity 60 would be formed. After the shell 44 has cured, the metal plug can be rotationally removed from the cavity 60. Thus, allowing the watercraft 34 to be removed from the mold without deformation. This process forms a female, threaded receptacle that is closed off from the interior of the boat, i.e. the bottom of the cavity is fully formed.

The quantity and position of the cavities 60 is not particularly limited. In the illustrated example, two cavities 60 are formed forward of the cockpit of the watercraft 34. Alternatively, or additionally, cavities 60 could be formed rearward of or alongside the cockpit. In the illustrated embodiment, the cavity 60 is recessed into one of the upward facing surfaces 50 of the deck 48.

Figure 4:
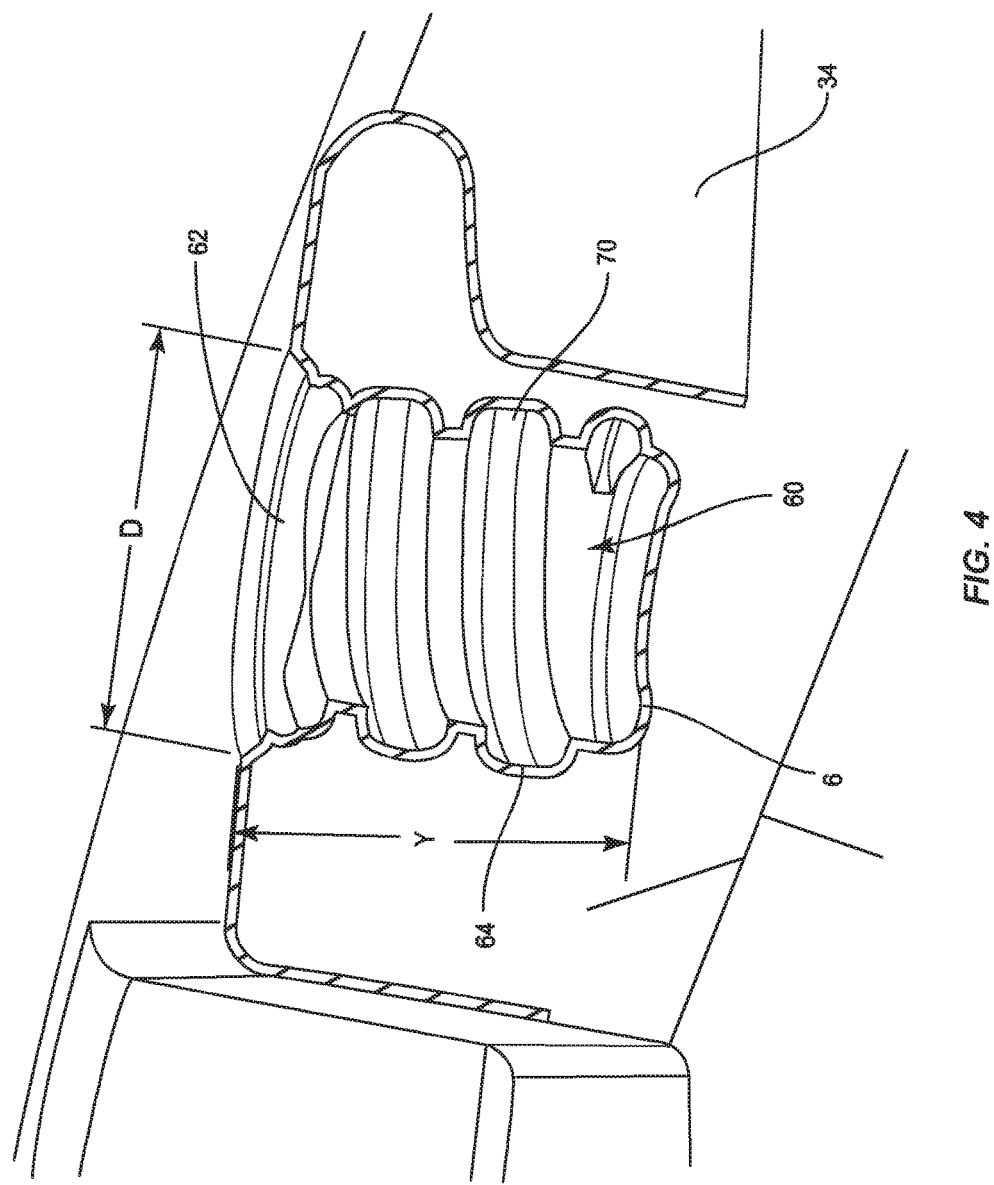
FIG. 4 shows a cross section of a watercraft according to aspects of the present disclosure.

FIG. 4 shows a cross section of the watercraft 34 that bisects one of the cavities 60. The cavity 60 can include a top opening 62 and a peripheral wall 64. The cavity 60 includes a bottom wall 66 which seals the bottom of the cavity 60. By including a closed bottom to the cavity 60, the watercraft 34 is able to avoid any additional unnecessary or unintended leak points, which could lead to water within an interior hollow within the watercraft.

The cavity 60 in the embodiment shown is configured to receive and removably retain the accessory mount 40 (FIG. 3) upon a twisting or rotating motion of at least a portion of the accessory mount. Example rotating motions including a quarter-turn engagement, a bayonet style engagement, or a threaded engagement. Mating features of the cavity 60 may be formed along the peripheral wall 64 or on the bottom wall 66. The mating features may be configured to receive and removably retain the accessory mount 40 without rotation. The mating features may facilitate a snap fit with retainer projections or lips, or retention recesses or dimples for interacting with potential resilient fastening portions of the accessory mount 40.

In the illustrated embodiment, the mating features of the cavity 60 are female threads 70 formed along the peripheral wall 64. The female threads 70 may be right handed or left handed. The form of the female threads 70 is not particularly limited, but may include square, triangular, or trapezoidal threads. The female threads 70 may be single start or double start. The pitch of the female threads 70, if present, is not particularly limited, but may range from about 0.25 inches to about 0.75 inches. The female threads 70 shown in FIG. 4 are right handed trapezoidal threads with a pitch of about 0.4 inches and a pitch depth of about 25%.

The cavity 60 may have a depth Y (FIG. 4) from the top opening 62 to the bottom wall 66 of between about 1.25 inches and about 2.5 inches. The depth Y is selected to be sufficiently deep to provide sufficient retention of the accessory mount 40 when properly attached, but may not be so deep to be suitable for use as a rod holder independent of the rotational attachment. Similarly, the cavity 60 may have a diameter D at the top opening 62 of about one-inch to about 1.5 inches. The diameter D is may be selected to be too small to receive the handle of a fishing rod but large enough to avoid becoming clogged with debris.

Returning to FIG. 3, the accessory mount 40 may include an adaptor 72 and an accessory support 74. The adaptor 72 and the accessory support 74 may be a single component forming the accessory mount 40 or may be separated into two or more separate components. An accessory 78, may be integrated with the accessory mount 40 or may be provided separately and attached thereto. In one example, the accessory 78 is a fishing rod, the accessory support 74 is a rod holder, and the adaptor 72 joins the rod holder to the watercraft 34. Additional or alternative accessory supports 74*a-c* and alternative accessories 78*a-c* are also illustrated in the form of supports with cameras, supports with fish finders or other electronic consoles, and supports with flashlights respectively. Further accessories may also include storage bins, mobile phone or tablet holders, drink holders, safety flags and wireless speakers.

Figure 5:
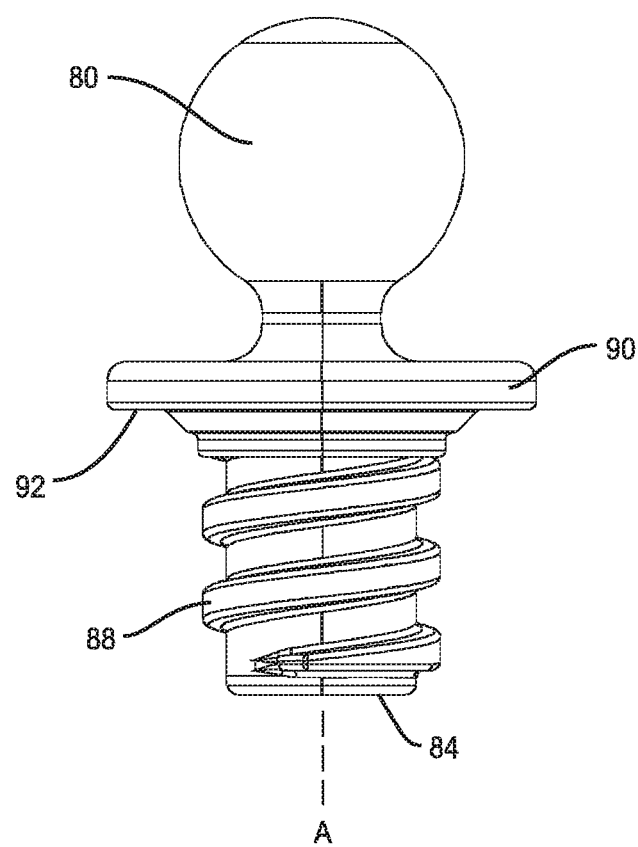
FIG. 5 shows an adaptor according to one embodiment for use in the mounting system of the present disclosure.

FIG. 5 shows a detailed view of an adaptor 72 according to one embodiment of the present disclosure. The adaptor 72 includes a coupler 80 and a base 84. The coupler 80 of the illustrated embodiment is a ball-shaped projection suitable to coupling with various accessory supports 74, 74*a-c* to form a ball joint. The ball-shaped projection may be formed with a one-inch or 1.5" diameter. The base 84 is configured to be received in the cavity 60 (FIGS. 3 and 4). When the cavity 60 includes female threads 70, the base 84 is provided with corresponding male threads 88. The form, pitch, and diameter of the male threads 88 correspond with the respective qualities of the female threads 70. As understood by one of ordinary skill in the art, the base 84 can therefore be screwed into the cavity 60. The adaptor 72 may include a flange 90 between the coupler 80 and the base 84. The flange 90 may be arranged substantially perpendicular to the longitudinal axis A of the base 84. The flange 90 may provide a structure to limit the insertion of the adaptor 72 into the cavity 60. The flange 90 also spreads the load of the accessory support 74 and accessory 78 over a wider area of the shell 44. A washer 92, made from a soft material such as silicone, may be arranged below the flange 90 to help the adaptor 72 seat along the deck 48 (FIG. 3).

As will be apparent to one of ordinary skill in the art upon review of the above disclosure, the watercraft 34 with cavities 60 facilitates the attachment of a variety of accessories 78, 78*a-c* to the watercraft in a tool-free manner that does not require modification of the shell 44. The cavities 60 also facilitate a quick interchange of accessories 78, 78*a-c* or the accessory mounts 40 therefor. Each of these advantages increases convenience for the owner of the watercraft 34.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A watercraft, comprising:
   a shell defining a hull and a deck,
   wherein the deck defines at least one cavity recessed into an upward facing surface of the deck, wherein at least one cavity is defined by a peripheral wall and a bottom wall, wherein at least one cavity is configured to receive and removably retain an accessory mount with in the cavity, and wherein the cavity is formed integrally with the deck during a roto-molding process.

2. The watercraft of claim 1, wherein the peripheral wall is threaded to receive and removably retain the accessory mount within the cavity with rotation of the accessory mount relative to the cavity.

3. The watercraft of claim 1, wherein the cavity has a depth between about 1.25 inches and about 2.5 inches, and wherein a top opening of the cavity has a diameter of less than about 1.5 inches.

4. The watercraft of claim 1, wherein the cavity is not reinforced.

5. A system, comprising:

a watercraft, the watercraft comprising:

a shell defining a hull and a deck, wherein the deck defines at least one cavity recessed into an upward facing surface of the deck, the cavity defined by a threaded peripheral wall and a bottom wall; and at least one accessory mount, the accessory mount being configured to be received in and removably retained by at least one cavity upon relative rotation between at least one accessory mount and the at least one cavity.

6. The system of claim 5, wherein at least one accessory mount comprises an adaptor and an accessory support, wherein the adaptor comprises a threaded case configured to mate with the threads of the peripheral wall.

7. The system of claim 5, wherein the cavity has a depth between about 1.25 inches and about ⅖ inches, and wherein a top opening of the cavity has a diameter of less than 1.5 inches.

8. The system of claim 5, wherein the cavity is formed integrally with the deck during a roto-molding process.

9. The system of claim 8, wherein the cavity is not reinforced.

10. The system of claim 5, wherein the accessory mount comprises an adaptor and an accessory support, wherein a base of the adaptor configured to be received in the cavity, wherein the accessor support is configured to be removably attached to the adapter, wherein the accessory support is configured to support at least one of a fishing rod, a camera, an electronic console, a storage bin, mobile phone or tablet holders, drink holders, safety flags and wireless speakers.

11. A method of attaching accessories to a kayak, comprising:

obtaining the kayak, the kayak comprising:

a shell defining a hull and a deck, wherein the deck defines at least one cavity recessed into an upward facing surface of the deck, the cavity defined by a threaded peripheral wall and a bottom wall;

obtaining at least one accessory mount;

rotating the accessory mount relative to the cavity such that the accessory mount is received within and removably retained by the cavity;

wherein the rotating the accessory mount relative to the cavity comprises screwing the accessory mount into the cavity.

12. The method of attaching of claim 11, wherein at least one accessory mount comprises an adaptor and an accessory support, wherein rotating the accessory mount relative to the cavity comprises rotating the adaptor relative to the cavity to insert the adaptor into the cavity.

13. The method of attaching of claim 12, further comprising attaching the accessory support to the adaptor.

14. The method of attaching of claim 13, further comprising attaching an accessory to the accessory support, wherein the accessory comprises at least one of a fishing rod, camera, an electronic console, a storage bin, mobile phone or tablet holders, drink holders, safety flags and wireless speakers.

15. The method of attaching of claim 11, wherein the accessory mount is attached to the kayak without modification of the shell after obtaining the kayak.

\* \* \* \* \*